United States Patent [19]

Cheselka

[11] 4,345,848
[45] Aug. 24, 1982

[54] SPECTACLE HINGE PIN

[76] Inventor: Stephen Cheselka, 87 Columbia St., Apt. 21-F, New York, N.Y. 10002

[21] Appl. No.: 97,842

[22] Filed: Nov. 27, 1979

[51] Int. Cl.³ .................. F16C 11/00; F16D 1/12
[52] U.S. Cl. ........................ 403/157; 411/482; 24/208 A; 16/228; 16/263
[58] Field of Search .............. 403/157; 16/128 A; 24/208 A, 217 R; 411/41, 482

[56] References Cited

U.S. PATENT DOCUMENTS

| | | | |
|---|---|---|---|
| 2,828,668 | 4/1958 | De Angelis | 16/128 A |
| 3,210,820 | 10/1965 | Humiston | 24/208 A |
| 3,416,200 | 12/1968 | Daddona | 24/208 A |
| 3,689,962 | 9/1972 | Erickson | 24/208 A |
| 3,757,389 | 9/1973 | Wiland | 24/217 R |
| 3,777,052 | 12/1973 | Fegen | 24/208 A |
| 3,869,766 | 3/1975 | Raymond | 24/208 A |
| 4,233,878 | 11/1980 | McGauran | 24/217 R |

FOREIGN PATENT DOCUMENTS 855945 12/1960 United Kingdom ............. 24/208 A

Primary Examiner—Wayne L. Shedd
Attorney, Agent, or Firm—Frishauf, Holtz, Goodman and Woodward

[57] ABSTRACT

A hinge pin, preferably made of plastic material comprises, in a first embodiment, a serrated portion which extends outwardly of the hinge and a cap member which snappingly and resiliently engages the serrated member, the serrated member being severable to adjust for hinge length. In other embodiments, the hinge pin has resilient flap-like members which normally extend outwardly of the shank of the hinge pin, and which are resiliently present against the hinge pin during insertion of the hinge. The flap-like members flapping outwardly after passing through the hinge to secure the hinge pin in place. In other embodiments, first and second members, which extend into the hinge pin opening of a hinge from opening ends thereof, are interconnected by a spring member which extends outwardly of the hinge to retain the hinge pin in place.

8 Claims, 19 Drawing Figures

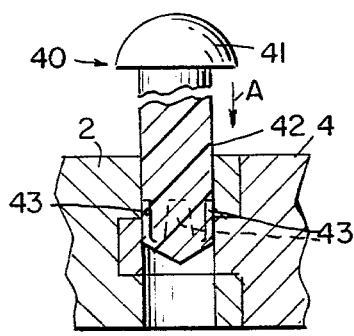
FIG.9
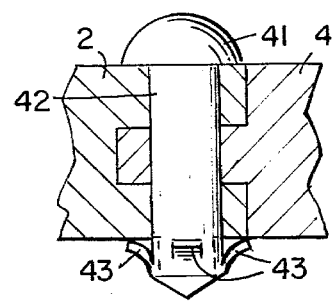
FIG.10
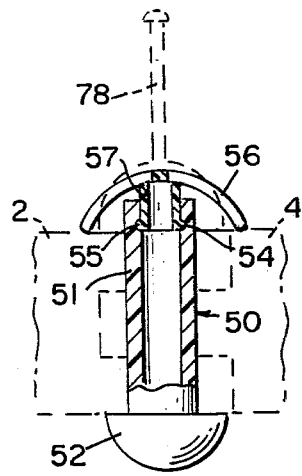
FIG.12
FIG.11
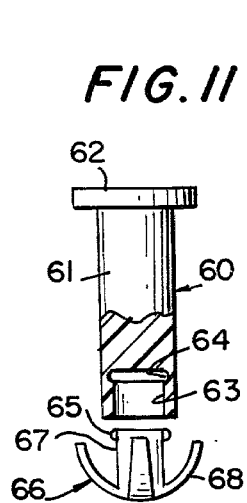
FIG.13
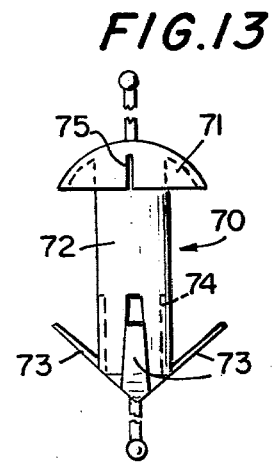
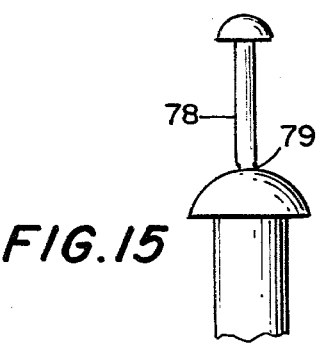
FIG.15
FIG.14
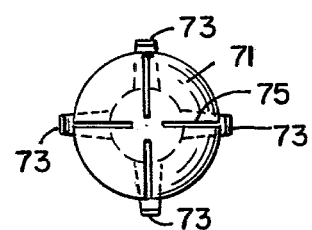

SPECTACLE HINGE PIN

BACKGROUND OF THE INVENTION

This invention relates to hinge pins, and more particularly to spectacle hinge pins and other hinge pins made of plastic, or similar materials, and which may be universally used in most spectacle hinges.

Spectacle hinges are generally connected together by means of threaded screws or other threaded members. The typical hinge is held together by a single screw. However, various other hinge pins are known, for example as shown in U.S. Pat. Nos. 1,593,630; 2,828,668; 2,926,381; and 2,947,024. Threaded screws such as illustrated in these prior patents are either of relatively complex construction, not universally useful in almost all hinge constructions, or are difficult to install by a user. U.S. Pat. Nos. 2,828,668 and 2,926,381 also make attempts at providing non-threaded members as hinge pins.

The object of this invention is to provide an improved hinge pin which is of non-threaded construction, which is substantially universally useful in most spectacle hinges and which may be easily installed by a user, even without technical skill.

A further object of the invention is to provide such a hinge pin which is easily manufactured at low cost, for example by molding of plastic materials.

SUMMARY OF THE INVENTION

According to a first embodiment of the invention, a hinge pin device comprises an elongated shank adapted to be received in a hinge opening of a hinge, at least a portion of the shank being serrated over a substantial portion of the length thereof, the serrations extending at least to the vicinity of one end of the shank. The shank has a length such that at least a portion of the serrated portion thereof extends out of the hinge opening. The shank has a head member at one end which is not passable through the hinge opening. A removable cap member is adjustably receivable over the serrated portion which extends out of the hinge opening for snappingly engaging the outwardly extending serrated portion to lock the cap onto the shank.

In a preferred embodiment, the cap member completely covers the outwardly extending serrated portion of the shank. In a further preferred arrangement, the interconnecting means is provided for interconnecting the shank and cap member to facilitate assembly of the hinge pin device. The interconnecting means is preferably selectively severable from the cap and shank members after installation.

According to another embodiment, a hinge pin device has an elongated shank and means at one end thereof which is impassable through the hinge opening. Resilient flap-like members are provided at the other end of the shank which are integrally connected to the shank and which are resiliently biassed to a position extending outwardly from the shank. The flap-like members are resiliently deformable towards the shank for passage through the hinge opening, and resiliently flap-outwardly after passing through the hinge opening to serve as a stop means for preventing the shank from becoming disengaged from the hinge opening. In a preferred arrangement, the shank is provided with recesses or the like for receiving the flap-like members when the shank is being passed through the hinge opening. In a further preferred arrangement, the shank is resiliently yieldable in the longitudinal direction and means is provided at the ends thereof for stretching the shank in the longitudinal direction during installation of the hinge pin in the hinge opening to facilitate permitting the flap-like members to resiliently extend outwardly of the shank after they have been passed through the hinge opening.

According to a further embodiment of the invention, the hinge pin device comprises first and second members which are adapted to be received in the hinge opening from opposite ends of the opening, and means interconnecting the first and second members, the interconnecting means comprising spring means to bias the first and second members toward each other to retain same in the hinge openings. Preferably, the spring interconnecting means and first and second members are integrally formed of a memory-type plastic. Instead of the spring means being provided, the first and second members may mutually lockingly engage with each other in the hinge opening, the interconnecting means merely connecting the members together to facilitate installation. When the interconnecting means comprises a spring-like means, handling tabs, or the like, are provided at opposite ends of the device to facilitate installation.

BRIEF DESCRIPTION OF THE DRAWINGS

FIGS. 9 and 10 illustrate the embodiment of FIGS. 7 and 8, FIG. 9 illustrating the embodiment partially inserted into a hinge, and FIG. 10 illustrating the embodiment fully inserted into a hinge;

FIG. 11 illustrates yet another embodiment of the invention fully inserted in a hinge;

FIG. 12 illustrates yet another embodiment of the invention;

FIGS. 13 and 14 illustrate plan and top views, respectively, of yet another embodiment of the invention;

FIG. 15 is a partial view of an embodiment of the present invention with an integral handling member;

DETAILED DESCRIPTION

Figure 1:
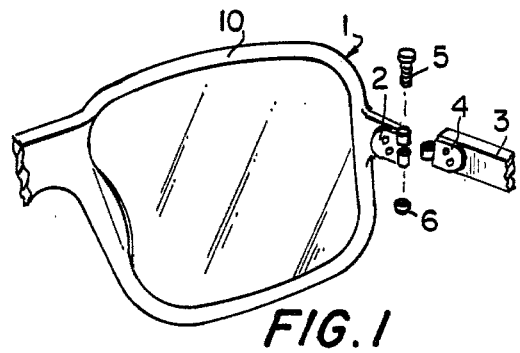
FIG. 1 is a perspective view of spectacles with the hinge and a hinge pin according to the present invention in disassembled form.

Referring to FIG. 1, the right half of a pair of spectacles 1 has a main portion 10 having a first hinge member 2 connected thereto, and a temple member 3 having a hinge member 4 connected thereto. The hinge members 2, 4 are conventional and are connected together by a hinge pin arrangement 5, 6. The hinge members 2, 4 are connected to the spectacles by means of rivets, screws, or any other conventional technique.

Figure 2:
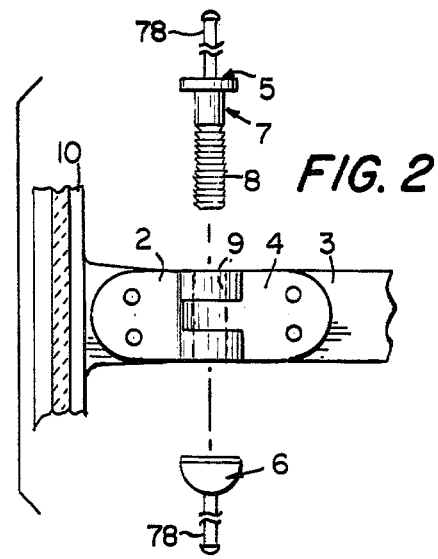
FIG. 2 is an exploded view of the hinge pin arrangement shown in FIG. 1.
Figure 4:
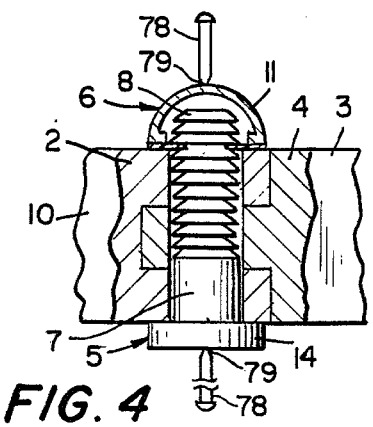
FIG. 4 is an exploded sectional view of the hinge pin arrangement of FIG. 2, in its assembled form, but in an inverted state.
Figure 3:
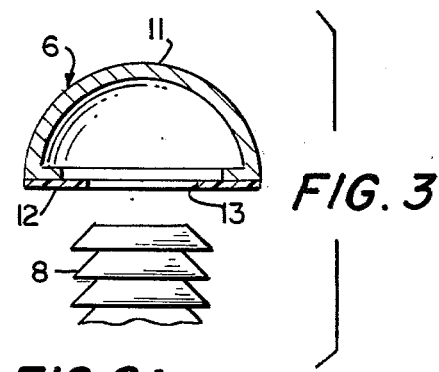
FIG. 3 is an exploded sectional view of the lower portion of the hinge pin of FIG. 2, but in an inverted state.

FIGS. 2-4 illustrate the hinge pin construction of FIG. 1 in greater detail. The hinge pin 5 has a shank portion 7 with serrations 8 thereon. The shank 7 and serrated portion 8 thereof are dimensioned so as to snugly fit within the hinge pin/hinge screw opening 9 of the hinge members 2, 4 so that the temple member 3 does not wobble relative to main portion 10 of spectacles 1. The shank 7 of hinge pin 5 is inserted into openings 9 to connect the hinge members 2, 4 together. The serrated portion 8 extends below the lower extremity of the hinge members 2, 4 and cap member 6 engages serrated portion 8, as shown in FIGS. 3 and 4. FIGS. 3 and 4 illustrate the arrangement of FIGS. 1 and 2 in an inverted state. The hinge pin, as is clearly seen, may be inserted from the top (FIGS. 1 and 2) or from the bottom (FIGS. 3 and 4), as desired.

The term "serrated", as used in this specification and claims, means not only a regular "ridged" construction as shown in FIGS. 2-5, but also other regular or irregular surface configurations that may be gripped by caps such as caps 6, 16 in the manner shown and described.

As shown in FIGS. 3 and 4, the cap member 6 comprises a dome-shaped portion with a bottom member 12 forming a narrow opening 13 into which the serrated portion 8 of shank 7 is insertable. Opening 13 is dimensioned so that it is smaller than the largest diameter portion of serrated portion 8, but is preferably larger than the smallest diameter portion of serrated portion 8. Upon pressing the cap 6 over the projecting end of serrated portion 8, as shown in FIG. 4, the bottom portion 12 of cap 6 becomes deflected allowing easy entry of the serrated portion 8 of shank 7. The cap 6 is pressed down until it substantially seats against the hinge members so as to securely lock same, with the bottom portion 12 of cap 6 seating itself in a recess of the serrated portion 8 of shank 7, thereby securely locking the hinge members 2, 4 together.

The cap 6 and/or the head 14 of hinge pin 5 may be made with a decorative outer surface, for example colored, covered with decorative stones, chrome-plated, or the like. Preferably, the cap 6 and hinge pin 5 are fabricated from molded plastic having the desired flexibility, strength and durability to operate as discussed above. Suitable materials are lexan, nylon, polyethylene, polypropylene, vinyl, etc. While the cap 6 is shown as being formed of two members 11, 12, the cap 6 may be integrally molded as one piece. The thickness of portion 12 is such that it may be retained between adjacent serrations of serrated portion 8 as shown in FIG. 4.

Figure 5:
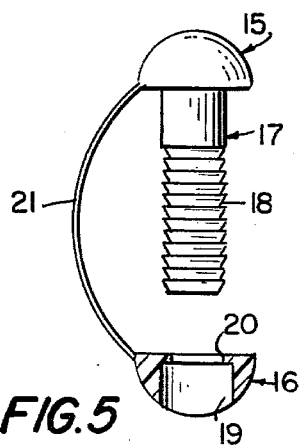
FIG. 5 illustrates a modified embodiment of the invention.

FIG. 5 illustrates a further embodiment of the invention. The hinge pin 15 is similar to the hinge pin 5 of FIG. 2 and is not further discussed in detail. The cap member 16 is preferably formed of a solid material, such as molded plastic, and has an opening 19 extending completely therethrough. The cap 16 has inwardly extending projection 20 for engaging serrations 18 of shank 17 of hinge pin 15. The external appearance of cap 16 is similar to that of cap 6, except for the opening 19 extending axially therethrough. The hinge pin 15 and cap 16 are integrally connected together by means of a flexible elongated tether-like member 21. When the hinge pin 15 and cap 16 are made of molded plastic, the connecting member 21 may be integrally made therewith in the same mold. Elongated connecting member 21 is for the purpose of retaining cap 6 and hinge pin 15 together so that the assembly of the hinge pin on the hinges is greatly facilitated. It also prevents loss of the cap 16 during handling, and facilitates installation. After installation on the spectacles, the flexible elongated connecting member 21 may be cut off by means of a blade, scissors, nailclip, or the like, or it may be pulled off. The elongated connecting member 21 may also be provided in the construction of FIGS. 1-4 to interconnect cap 6 and hinge pin 5 together.

Figure 6A:
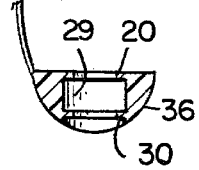
FIGS. 6A–6C illustrate sectional views of modified receptacles of the hinge pin of FIG. 5.
Figure 6B:
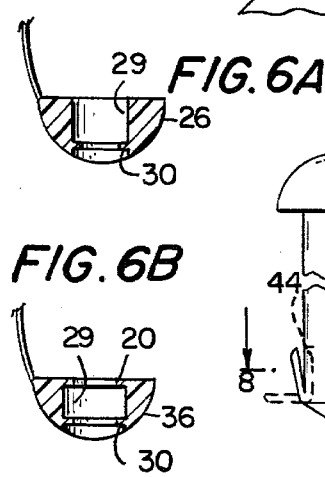
Figure 6C:
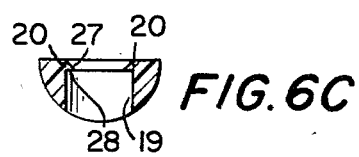

FIGS. 6A-6C illustrate modified caps similar to cap 16 illustrated in FIG. 5. In FIG. 6A, the cap 26 has an inward projection 30 at the lower end of its through opening 29. Inwardly projecting portion 30 engages the serrations 18 of the hinge pin 15.

FIG. 6B illustrates an embodiment wherein a cap 36 has inwardly projecting portions 20 at one end of the through hole 29, and inwardly projecting portions 30 at the bottom end of the through hole 29. This arrangement provides double engagement of the serrated portions 18 to provide even more secure interconnection of the cap 36 with the hinge pin 15.

After the hinge pin 15 is secured to a cap 16, 26, 36, if the shank 18 extends outside of the cap (that is, through the bottom of opening 19 or 29), it may be cut off by means of a blade, scissors, nailclip, or the like to improve the appearance of the resulting construction, or it may be snapped off. The length of the shank 7 of FIG. 2 may be similarly adjusted.

FIG. 6C illustrates a modified form of projection 20, 30 having a downwardly sloping upper end 27 to facilitate insertion of the serrated member 18. The bottom surface 28 of projection 20 is preferably substantially perpendicularly extending from the wall of opening 19 so that still better engagement with a flat-topped serration of serrated portion 18 (FIG. 5) is obtained when the cap is inserted on the shank 17 of a hinge pin 15.

Figure 7:
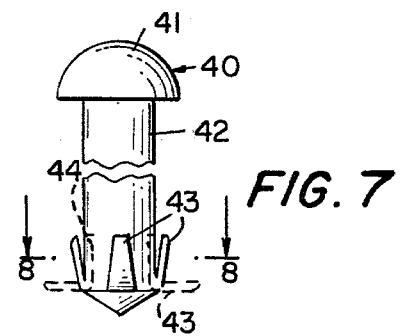
FIGS. 7 and 8 are plan and sectional views, respectively, of another embodiment of the invention.
Figure 8:
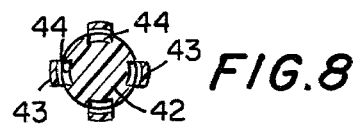

FIGS. 7 and 8 illustrate a further embodiment of the invention wherein a hinge pin 40 is of integral construction. The hinge pin 40 comprises a cap portion 41, a shank portion 42 extending from the cap 41 and a lower portion having flap-like members 43 extending therefrom. The hinge pin 40 of FIGS. 7 and 8 is fabricated of a flexible plastic material and the flap-like members 43 are preferably normally in their outwardly extending state as shown by dashed lines in FIG. 7. The shank 42 of hinge pin 40 has recesses 44 therein which are generally dimensioned to accommodate flap-like members 43 therein when flap-like members 43 are resiliently folded upwardly as shown in solid lines in FIG. 7.

In use, the hinge pin of FIG. 7 is inserted into the opening of hinge members 2, 4 as shown in FIG. 9. During insertion, the flap-like members 43 are resiliently deflected toward the shank portion 42 and are accommodated in the recesses 44. The hinge pin is pressed into the hinges 2, 4 in the direction of the arrow A in FIG. 9 until the lower portion with flap-like members 43 extends below the bottom surface of the hinge pin, whereupon the flap-like members 43 spring outwardly and are retained against the lower surface of the hinge members 2, 4 as shown in FIG. 10. The flap-like members 43 project outwardly due to the spring-like qualities of the plastic from which the pin is fabricated and securely retains the hinge pin in place. The length of shank portion 42 is dimensioned so that it is sufficiently long that flap-like members 43 can be pushed out through the bottom of the hinge to enable them to springingly project outwardly. The hinge pin may be made of a resilient rubber-like or plastic material, such as nylon, polyethylene, polypropylene, vinyl, or other material having similar properties, with a resilient head portion 41 so that pressure on head portion 41 causes the shank 42 to project outwardly, releasing of the pressure on head 41 pulling the shank 42 slightly upwardly to more securely lock the hinge pin in place. Alternatively, the head portion 41 of the pin may be generally hollow, as illustrated for example, by the removable heads 56, 66 in FIGS. 11 and 12, and head 71 in FIGS. 13 and 14, for easier and secure insertion of hinge pin. The operation of the hollow resilient head portion 41 will be discussed hereinbelow with respect to FIGS. 11-14.

FIG. 11 illustrates an embodiment of the invention comprising a hinge pin 60 having a shank portion 61 and a head portion 62 integral therewith. The end of the shank 61 oppostie the head 62 has a hollow 63 formed therein with an enlarged bottom 64 for receiving a protrusion 65 of a cap member 66. Cap 66 has an elongated portion 67, the end of which terminates in the protrusion 65 which resiliently engages the enlargement 64 in the shank 61. In use, the shank 61 is inserted into the openings of the hinge members 2, 4 and the cap 66 is inserted into the opening 63 at the end of the shank 61 from the opposite end of the hinge members. The outer generally round portion 68 of the cap member 66 is hollow, as shown in FIG. 11 so that it will yield when the cap member is pressed onto the shank member 61 to produce a substantially snug engagement with the hinge. Alternatively, the head 62 may also be rounded 68 and hollow as cap member 66. The rounded portion 68 may be slit, as discussed hereinbelow with respect to FIG. 13, to provide greater resilience thereof during mounting. Instead of opening 63 being provided with an enlargement, opening 63 could be provided with other engaging means for engaging appropriate surface configurations on extension member 67 of cap 66.

FIG. 12 illustrates a modified embodiment, similar to that of FIG. 11. In FIG. 12, the shank 51 of the hinge pin 50 is hollow and has a notch 54 at the end thereof opposite the end having the cap or head 52 thereon. The cap 56 has an elongated portion 57 extending therefrom, the elongated portion having a protrusion 55 at the end thereof which engages with notch 54. Preferably, the shank 51 and elongated portion 57 are cylindrical. The materials are resilient so that the elongated portion 57 with its protrusion snaps into the hollow of shank 51 and engages notch 54. The embodiment of FIG. 12 is shown mounted on a hinge 2,4. In use, the cap 56 is generally hollowed out and during installation, the cap is pressed onto the shank 51 so that the cap 56 is deformed outwardly as shown by the solid lines in FIG. 12. The dashed line representation illustrates the cap 56 before it is pushed downwardly to be deformed to tightly engage the shank 51 and to retain the hinge 2,4 securely in place with a snut fit. The head 52 may also be hollowed out, in a manner similar to cap 56, to provide resilient engagement against the hinge, as shown in FIG. 12 with respect to cap 56. Slits, such as slits 75 of FIG. 13, may be provided in the cap 56 and/or in a hollowed out head 52. A handling member 78, similar to those shown in FIGS. 10, 12, 13, 15 and 19, may be provided on the cap 56 and/or the head 52 to facilitate handling and assembly, the handling member 78 being severable after assembly is completed.

FIG. 13 illustrates an embodiment similar to that of FIGS. 7-10. The hinge pin 70 comprises a hollow head portion 71 integrally formed with a shank portion 72. The lower end of the shank portion is provided with flap-like members 72 which are shown in their normal or rest condition. Flap-like members 73 are integrally formed with the shank 72 and are formed of a springy material so that they may be flexed inwardly to seat in recesses 74 in shank 72 so that the shank and flexible flap-like members 73 form a substantially smooth exterior surface for easy insertion of the hinge pin into the opening of a hinge. The hinge pin 70 of FIG. 13 is inserted in the same manner as illustrated in FIGS. 9 and 10. However, when the hinge pin is fully seated in the hinge, the head portion 71 thereof may be pressed down to cause same to yield in order to press the shank 72 farther into the hinge members 2, 4 to enable the flap members 73 to clear the bottom of the hinge members 2, 4 so that the flap-like members 73 will springingly return to their outward position as shown in FIG. 13. Then, when the head 71 is released, the resiliency of its flexible head portion 71 will pull the shank 72 upward slightly to provide tight engagement of the flap-like members 73 against the bottom portion of the hinge members 2, 4 as shown in FIG. 10.

The head portion 71 has slits 75 formed therein so that greater yielding of the head portion is obtained when it is pressed downwardly by the user to enable the flap-like members 73 to clear the bottom of the hinge 2, 4. Preferably, the hinge pin of FIG. 13 is made of a flexible, yieldable material, such as polyethylene, nylon, polypropylene, vinyl, or the like.

FIG. 15 illustrates a handling member 78 which is secured to one or both ends of the hinge pins of the present invention. For example, the handling member 78 may be formed integrally with the hinge pin or, when applicable, with the cap for the hinge pin to facilitate handling of the very small parts during assembling in a hinge. After the hinge pin is fully inserted and installed, the handling members 78 may be snapped off at the weakened or necked down area 79, or may be cut off by means of a blade, scissors, nailclip, or any other cutting implement. The handling member 78 may be provided on one or both ends of any of the embodiments of the present invention.

Figure 16:
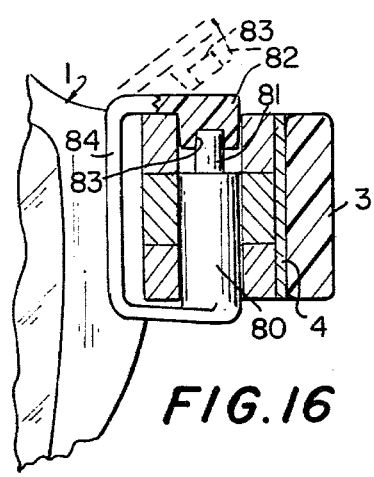
FIG. 16 is a sectional view of yet another embodiment of the invention.

FIG. 16 is a modified embodiment of the invention which is of one-piece construction. The hinge pin arrangement of FIG. 16 comprises a first shank member 80 having a projecting member 81 extending upwardly therefrom. A top cap-member 82 has a bore 83 therein for receiving projection 81, preferably in a snug manner. The cap-like member 82 is integrally connected to the shank member 80 by means of an interconnecting member 84 which is generally U-shaped. In an alternate arrangement, as illustrated in FIG. 16A, the cap-like member 82' and the projection 81' have a snappingly engageable configuration so as to lock the two members together in a more secure manner.

Figure 16A:
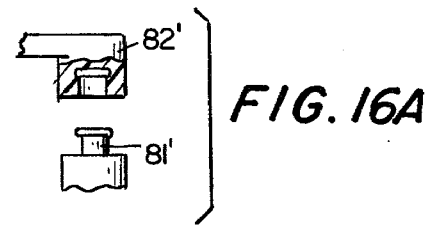

The hinge pin arrangement of FIGS. 16 and 16A is integrally formed of a memory-type plastic, such as vinyl, polyethylene, nylon, polypropylene, or other materials having similar properties. The device is molded so that when the cap-like portion 82 is swung upwardly to the position shown by dashed lines in FIG.

16, the material has a tendency to be urged back to its initial position as illustrated by the solid lines in FIG. 16. The urging of the material is generally sufficient to provide secure engagement and retention in the hinge. However, if additional retention is required, a snap-type engagement configuration, such as shown in FIG. 16A for example, can be used. The snap-like engagement of FIG. 16A can be used with or without making the device of memory-type plastic.

Figure 17:
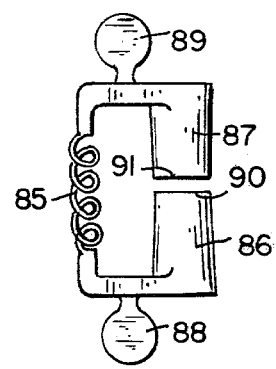
FIG. 17 is a plan view of an embodiment similar to that of FIG. 16.

FIG. 17 illustrates a modified arrangement, similar to that of FIG. 16, but in which the interconnecting member 84 is replaced with a coil-spring-like member 85 which is integrally formed with the remainder of the device, the complete device preferably being made of a memory-type plastic. The hinge pin member comprises a lower shank portion 86 and a upper shank portion 87 interconnected by said coil-spring-like interconnecting member 85. In use, shank portions 86, 87 are spread apart, preferably by means of handling tabs 88, 89 coupled to the shank portions 86, 87, respectively. One of the shank portions is inserted into the opening of the hinge, and the other is then guided into the opposite end of the opening so that the shank portion 86, 87 substantially meet, as shown in FIG. 17.

In the embodiment of FIG. 17, the free ends 90, 91 of the shank portions 86, 87, respectively, are not interengaged with each other. In an alternative arrangement, one of the shank portions 86 could have a projection similar to projection 81 of FIG. 16, and the other shank portion 87 could have a receiving opening similar to opening 83 in FIG. 16. Such an arrangement would provide still more secure engagement of the hinge pin device with the hinge. Snappingly locking enggement means, such as shown in FIG. 16A, could be used in connection with the projection and receptacle. However, making the entire device of a springy memory-type plastic should provide secure enough engagement in most instances without projections and receptacles as illustrated in FIG. 16.

Figure 18:
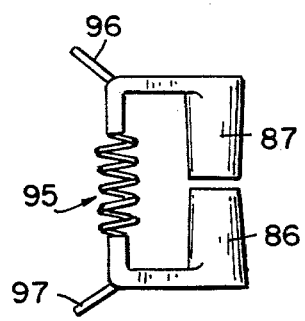
FIG. 18 is an embodiment similar to that of FIG. 17.

FIG. 18 illustrates an embodiment similar to that of FIG. 17, but wherein the coil-spring portion 85 of FIG. 17 is replaced by a zig-zag springy portion 95. The complete device, including the zig-zag portion 95 is integrally formed of a flexible plastic material of the memory-type. The members 86, 87 in FIG. 18 are identical with the corresponding members in FIG. 17. If desired, projections and receptacles, such as projection 81 and receiving opening 83 of FIG. 16, can be used. The embodiment of FIG. 18 has handling tabs 96, 97 secured to the portion thereof above and below the zig-zag portion 95. In use, the handling tabs 96, 97 are gripped between the thumb and forefinger of a user, and are squeezed together to cause zig-zag portion 95 to yield in an arcuate manner, thereby causing members 86, 87 to separate. The separated members 86, 87 are then installed in a hinge in a manner similar to that discussed above with respect to FIGS. 16 and 17.

Handling tabs 88, 89 of FIG. 17, and tabs 96, 97 of FIG. 18, may be break-away tabs with a necked down or weakened portion at the point where they attach to the hinge pin device. Alternatively, they can be cut off by means of a blade or scissors, nailclip, etc.

Figure 19:
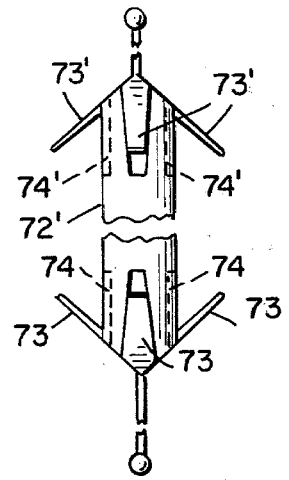
FIG. 19 is a perspective view of still another embodiment of the invention.

FIG. 19 illustrates an embodiment similar to that of FIG. 13, but wherein the cap portion 71 is replaced by another set of springy flap-like members 73' and wherein the shank 72' has additional receiving openings 74' into which the flap-like members 73' are received during insertion of the device into a hinge. The device of FIG. 19 is inserted in a hinge in a manner similar to that illustrated in FIGS. 9 and 10, except that the cap 41 in FIGS. 9 and 10 is replaced by the additional flap-like members 73'. The hinge pin of FIG. 19 can be inserted in any direction and from either end. If it is desired to only unidirectionally insert the hinge pin of FIG. 19 into a hinge, then the openings 74' for receiving the flap-like members 73' can be eliminated. In this case, the pin can only be inserted from the lower end thereof.

The hinge pin devices of the present invention may be made of plastics such as polyethylene, nylon, polypropylene, vinyl, polyurethane, or other similar materials. For additional flex strength, urea is usually added to the polyurethane, polyethylene, vinyl, etc.

While the invention has been specifically described with reference to spectacle hinge pins, the hinge pins may be used in any hinge-type application and in any size, as desired.

I claim:
1. A hinge pin device for spectacle hinges having a hinge pin or hinge screw opening (9), comprising:
   an elongated shank (7) adapted to be received in the hinge opening (9) of the hinge, at least a portion of said shank being serrated (8) over a substantial portion of the length thereof and said serrations extending at least to the vicinity of one end of said shank, said shank having a length such that at least a portion of the serrated portion thereof extends out of the hinge opening (9);
   a head member (5) on the end of said shank opposite said one end, said shank extending from said head member in a given direction, said head member (5) being impassible through said hinge opening (9);
   a cap member (6) adjustably receivable over said one end of said shank and selectively engageable with at least one of said serrations which extends out of the hinge opening (9), said cap member having an opening smaller than the maximum diameter of the serrated portion (8) of said shank (7) for snappingly engaging said outwardly extending serrated portion of said shank to lock said cap onto said shank, said cap member being impassible through said hinge opening;
   a first elongated handling member (78) coupled to said shank and extending from said head member in the longitudinal direction of said shank and in the direction opposite to the direction said shank extends from said head member, said first handling member having a cross section in a direction perpendicular to its longitudinal axis, which is substantially smaller than that of said shank, and being selectively breakable off from said shank; and
   a second elongated handling member (78) coupled to said cap member and extending substantially in the longitudinal direction of said shank when said cap member is attached to said shank, said second handling member having a cross-section in a direction perpendicular to its longitudinal axis, which is substantially smaller than that of said shank, and being selectively off from said cap member.

2. The hinge pin of claim 1 further comprising means (21) interconnecting said shank (7) and cap member (6), said interconnecting means being selectively severable from said shank and cap member.

3. The hinge pin of claim 2 wherein said interconnecting means (21) is selectively and severable connected between said head member (5) and said cap member.

4. The hinge pin of claim 1 wherein said head member (5) and cap member (6) respectively abut said hinge on opposite sides of said hinge opening (9).

5. The hinge pin of claim 1 wherein said cap member has a through hole (19,29) therethrough such that said outwardly extending serrated portion of said shank may extend through said cap member.

6. The hinge pin of claim 5 wherein said through hole has at least one shoulder member (20,30) extending inwardly toward the center of said through hole for snappingly engaging said outwardly extending serrated portion of said shank.

7. The hinge pin of claim 6 wherein said shoulder is located at the portion of said cap which is closest to said hinge.

8. The hinge pin of claim 7 comprising a further shoulder axially spaced from said innermost shoulder for snappingly engaging said outwardly extending serrated portion of said shank.

* * * * *